United States Patent [19]

Huang

[11] Patent Number: 5,275,985
[45] Date of Patent: Jan. 4, 1994

[54] PRODUCTION OF A SINTERED REACTION BONDED SILICON NITRIDE INSULATOR

[75] Inventor: Jow-Lay Huang, Troy, Mich.

[73] Assignee: Cooper Industries, Inc., Houston, Tex.

[21] Appl. No.: 576,135

[22] Filed: Aug. 23, 1990

Related U.S. Application Data

[63] Continuation-in-part of Ser. No. 329,193, Mar. 27, 1989, abandoned, which is a continuation-in-part of Ser. No. 111,990, Oct. 22, 1987, abandoned.

[51] Int. Cl.$^5$ .............................................. C04B 35/58
[52] U.S. Cl. .......................................... 501/97; 501/98; 264/65
[58] Field of Search ........................ 501/97, 98; 264/65

[56] References Cited

U.S. PATENT DOCUMENTS

| | | | |
|---|---|---|---|
| 4,125,592 | 11/1978 | Ezis et al. | 264/65 |
| 4,285,895 | 8/1981 | Mangels et al. | 264/65 |
| 4,351,787 | 9/1982 | Martinengs et al. | 264/65 |
| 4,354,990 | 10/1982 | Martinengo et al. | 264/65 |
| 4,356,136 | 10/1982 | Mangels | 264/65 |
| 4,410,636 | 10/1983 | Minjolle et al. | 501/98 |
| 4,500,482 | 2/1985 | Huther | 264/65 |
| 4,521,358 | 6/1985 | Miura et al. | 501/97 |
| 4,576,923 | 3/1986 | Broussaud et al. | 501/96 |
| 4,687,655 | 8/1987 | Hunold et al. | 501/97 |
| 4,699,890 | 10/1987 | Matsui | 501/97 |
| 4,716,133 | 12/1987 | Horiuchi et al. | 501/97 |

FOREIGN PATENT DOCUMENTS

| | | |
|---|---|---|
| 0240177 | 7/1987 | European Pat. Off. ...... C04B 35/80 |
| 717555 | 10/1954 | United Kingdom . |
| 1546928 | 5/1979 | United Kingdom . |
| WO84/01372 | 4/1984 | World Int. Prop. O. .... C04B 35/58 |

OTHER PUBLICATIONS

SiC-Whisker-Reinforced $Si_3N_4$ Composites, by Lundberg et al, Am. Ceram. Soc. Bull., 66 (2) 330-33 (1987).

*Primary Examiner*—Helene Klemanski
*Attorney, Agent, or Firm*—John C. Purdue; David C. Purdue

[57] ABSTRACT

A method for producing a sintered reaction bonded silicon nitride insulator is disclosed. The method comprises mixing powdered silicon having an average particle size not greater than 5 $\mu$m with from 3 to 7 percent each of MgO and $CeO_2$, pressing a shape from the resulting mixture, calcining the shape, grinding the calcined shape to a desired contour, and heating the ground shape in a nitrogen atmosphere at a pressure of about 1 atmosphere absolute. The MgO and $CeO_2$ serve as sintering aids. Other suitable sintering aids include 2 to 8 percent of $Y_2O_3$, 6 percent of $Y_2O_3$ and 2 percent of $Al_2O_3$, and 2 to 8 percent of MgO, BeO, $HfO_2$ or $Zr_2O_2$. The heating of the ground shape is controlled, until a reaction bonded $Si_3N_4$ body is produced in which at least 99 percent of the Si in the initial charge is reacted to $Si_3N_4$, so that reaction between nitrogen and the ground shape is substantially complete at any given temperature before the shape is heated above that temperature, and, thereafter, to produce a sufficient amount of a cerium-magnesium silicate glass to produce a $Si_3N_4$ body having from 85 to 90 percent of theoretical density.

2 Claims, No Drawings

PRODUCTION OF A SINTERED REACTION BONDED SILICON NITRIDE INSULATOR

REFERENCE TO RELATED APPLICATION

This is a continuation in part of application Ser. No. 07/329,193, filed Mar. 27, 1989, itself a continuation in part of application Ser. No. 111,990, filed Oct. 22, 1987, both now abandoned.

DEFINITIONS

As used herein, and in the appended claims, the terms "percent" and "parts" refer to percent and parts by weight, unless otherwise indicated; g means gram or grams; mg means milligram or milligrams; m means meter or meters; cm means centimeter or centimeters; mm means millimeter or millimeters; both micron and $\mu$m mean $10^{-6}$ & meter; l means liter or liters; psi means pounds per square inch; and MPa means $10^6$ Pascals.

All temperatures herein are in degrees C., unless otherwise indicated.

BACKGROUND OF THE INVENTION

1. Field of the Invention

This invention relates to the production of a silicon nitride ceramic by a method which includes a reaction bonding step and a sintering step, carried out during the course of a single, uninterrupted heating step.

2. The Published Art

U.S. Pat. No. 4,356,136, granted Oct. 26, 1982 to Mangels, discloses that a reaction bonded silicon nitride ceramic can be packed in silicon nitride powder and a densification aid, and densified by a two step firing procedure in a nitrogen atmosphere. The first step is in a low pressure nitrogen atmosphere while the second is in a high pressure nitrogen atmosphere. Example 1 of the patent discloses a first step firing in 15 psi. nitrogen to 1875° C. and a second step firing in 300 psi. nitrogen to 1925° C.

U.S. Pat. No. 4,351,787, granted Sep. 28, 1982 to Martinengo et al., discloses that a shape can be pressed from a mixture of silicon particles and a sintering aid, that the shape can be nitrided to produce a reaction bonded shape, and that the reaction bonded shape, after it has been embedded in a protective powder can be densified by firing in a nitrogen atmosphere. In Example 1, the protective powder is composed of $Si_3N_4$, BN, MgO and Fe and the firing is to 1800° C., final nitrogen pressure 750 Torr.

U.S. Pat. No. 4,687,655, granted Aug. 18, 1987 to Hunold et al., discloses (Example 6) that ceramics having a silicon nitride content of 99.1 percent, 98 percent of theoretical density, can be produced by cold isostatic pressing of a mixture of silicon powder, yttrium oxide powder and aluminum oxide powder, and subjecting the shapes which are produced to a two-stage firing in a high pressure nitrogen atmosphere. The first stage of the firing was to a maximum temperature of 1270°, nitrogen pressure from 50 to 80 MPa, while the second stage was to a maximum temperature of 1800°, nitrogen pressure from 80 to 150 MPa. The patent also states that cycles comparable to the Examples would last from 100 to 140 hours in the case of nitridation with nitrogen or nitrogen/hydrogen mixtures under normal pressure.

It has also been suggested (see, for example, U.S. Pat. No. 4,500,482, granted Feb. 19, 1985) that a mixture of silicon, silicon nitride and an organic binder can be molded to a desired shape, nitrided, and hot isostatically pressed to produce a silicon nitride ceramic and (see, for example, GB PS 1,546,928, May 31, 1979) that a molding can be produced from silicon powder and sintered in an inert atmosphere to 60-75 percent of theoretical density prior to nitriding to form silicon nitride.

BRIEF DESCRIPTION OF THE INSTANT INVENTION

The instant invention is a method for producing a sintered reaction bonded silicon nitride insulator. The method comprises mixing powdered silicon having an average particle size not greater than 5$\mu$m with a suitable amount of a sintering aid pressing a shape from the resulting mixture, calcining the shape, grinding the calcined shape to a desired contour, and heating the ground shape in a nitrogen atmosphere at a pressure of about 1 atmosphere absolute. The sintering aid, most desirably, is 3 to 7 percent each of MgO and $CeO_2$, but can also be 2 to 8 percent of $Y_2O_3$, 6 percent of $Y_2O_3$ and 2 percent of $Al_2O_3$, or 2 to 8 percent of MgO, BeO, $HfO_2$ or $ZrO_2$. Heating of the ground shape is controlled, during the course of a single, uninterrupted heating step, until a reaction bonded $Si_3N_4$ body in which at least 99 percent of the Si in the initial charge is reacted to $Si_3N_4$, so that reaction between nitrogen and the ground shape is substantially complete at any given temperature before the shape is heated above that temperature, and, thereafter, to produce a sufficient amount of a cerium-magnesium silicate or other glass to produce a $Si_3N_4$ body having from 85 to 90 percent of theoretical density.

DESCRIPTION OF THE PREFERRED EMBODIMENTS

The invention will be more fully understood from the following Example, which constitutes the best mode presently contemplated by the inventor.

EXAMPLE

Silicon nitride insulators were produced from 550 g powdered silicon which contained substantially 0.43 percent of iron, 38 g Mgo and 38g $CeO_2$. The powdered silicon had previously been dry milled for fifteen hours with 1.2g triethanolamine to an average particle size of 4$\mu$m, range 2-20 $\mu$m. A charge made up of the silicon, the MgO, the $CeO_2$, and 950 ml anhydrous ethyl alcohol was milled for four hours in a jar mill and the slurry from the mill was dried by distilling the ethanol from a rotating flask. Cylindrical shapes about 19 mm in diameter, 51 mm in length, and having a central bore about 7 mm in diameter were then pressed, using an isostatic press, from the dried material, pressing pressure 30,000 psi (about 207 MPa).

The pressed shapes were heated in air at about 74° per hour to 480°, one hour dwell, to volatilize the triethanolamine, and were then calcined under vacuum at a temperature of about 1000°, one hour dwell, to improve the green strength. The calcined bodies were then ground to a desired shape, and the ground bodies were placed in a molybdenum setter which, in turn, was placed in an electrically heated furnace with a tungsten heating element; the furnace was evacuated; and the bodies were fired. The firing involved:

(1) heating to 750° at about 6° per minute, and holding at 750° for two hours, initially maintaining the vacuum in the furnace;

(2) after about 1¼ hours of the hold at 750°, introducing an atmosphere composed of 71 volume percent nitrogen, 25 volume percent helium and 4 volume percent hydrogen into the furnace to increase the absolute pressure therein to about 1.1 atmospheres, and applying an atmosphere of this composition to the furnace to maintain the indicated pressure;

(3) at the end of the hold at 750°, and thereafter throughout the remainder of the cycle, applying nitrogen (rather than the atmosphere composed of nitrogen, helium and hydrogen) to the furnace to maintain a pressure of about 1.1 atmospheres, and commencing heating to 1430° at a nominal rate of 5° per hour, but with a dwell whenever a sensor received a signal indicating an appreciable consumption of nitrogen;

(4) heating to 1550° at 5° per minute as soon as reaction between the bodies and nitrogen was complete (in most cases reaction was complete when the furnace reached 1430°);

(5) holding at 1550° for two hours; and (6) cooling at 15° per minute in the furnace.

It will be appreciated that the firing of the ground bodies was carried out as a single, uninterrupted heating step. The resulting insulators were found to have densities which were about 87 percent of the theoretical density, and to be composed of sintered reaction bonded silicon nitride which was essentially devoid of silicon and a small amount of a ceria-magnesia silicate glass. They had excellent dielectric properties, for example, a dielectric strength greater than 360 volts per mill at a wall thickness of 1.3mm, because there was essentially no contamination of the silicon nitride by conductive impurities such as silicon. They were admirably suited for use as spark plug insulators because their erosion, when subjected to a spark discharge, was comparable to that of conventional electrode materials, and because they had excellent resistance to thermal shock; for example, the delta T required to cause cracking was greater than 900°. They were also strong, as indicated by a four point bend strength of 74,000 psi.

It has been found that the MgO-CeO$_2$ sintering aid in insulators produced as described in the foregoing example is highly advantageous because it volatilizes to a limited extent, during firing, and, as a consequence, limits the theoretical density that can be achieved to one in the range of about 85 to 90 percent, thereby assuring the previously mentioned spark erosion match with conventional electrode materials. However, the method is also operable when other sintering aids are substituted therefor; for example, the MgO-CeO$_2$ can be replaced by 2 to 8 percent of Y$_2$O$_3$, by 6 percent of Y$_2$O$_3$ and 2 percent of Al$_2$O$_3$, by 2 to 6 percent of MgO, by 2 to 6 percent of BeO, by 2 to 6 percent of HfO$_2$, or by 2 to 6 percent of ZrO$_2$. Indeed, the procedure of Example 1, supra, has been carried out to produce insulators from the silicon identified above and other sintering aids or sintering aid compositions. Representative starting compositions are set forth in the following table:

|  | Composition in Parts | | | |
| --- | --- | --- | --- | --- |
|  | Silicon | Y$_2$O$_3$ | Al$_2$O$_3$ | MgO |
| Example 2 | 550 g | 47.8 g | — | — |
| Example 3 | 550 g | 31.9 g | 15.9 g | — |
| Example 4 | 550 g | — | — | 35.1 g |
| Example 5 | 550 g | — | — | 17.0 g |

The Example 2 insulators were found to have densities of 245 g/cm$^3$, and to be composed of sintered reaction bonded silicon nitride which was essentially devoid of silicon. It is apparent from the foregoing data and phase considerations that when the Example 2 procedure is repeated, using a firing temperature of about 1900°, insulators composed of sintered reaction bonded silicon nitride which is essentially devoid of silicon and a small amount of an yttrium silicate glass are produced, and are admirably suited for use as spark plug insulators.

The Example 3 insulators were found to have densities of 2.45 g/cm$^3$, and to be composed of sintered reaction bonded silicon nitride which was essentially devoid of silicon. It is apparent from the foregoing data and phase considerations that when the Example 3 procedure is repeated, using a firing temperature of about 1825°, insulators composed of sintered reaction bonded silicon nitride which is essentially devoid of silicon and a small amount of an yttrium aluminum silicate glass are produced, and are admirably suited for use as spark plug insulators.

The Example 4 insulators were found to have densities of 2.64 g/cm$^3$, a dielectric strength of 442 volts per mil at a wall thickness of 1.3 mm, and to be composed of sintered reaction bonded silicon nitride which was essentially devoid of silicon and contained a small amount of a magnesium silicate glass; they were admirably suited for use as spark plug insulators.

The Example 5 insulators were found to have densities of 2.58 g/cm$^3$, a dielectric strength of 366 volts per mil at a wall thickness of 1.3 mm, and to be composed of sintered reaction bonded silicon nitride which was essentially devoid of silicon and contained a small amount of a magnesium silicate glass; they were admirably suited for use as spark plug insulators.

It has also been found that the small amount of iron in the silicon starting material used in practicing the method described in the foregoing Examples is advantageous, because it acts as a catalyst for the removal of SiO$_2$ from the insulators, about 0.2 to 0.6 percent thereof being desirable in the batch. Fe$_2$O$_3$ (or NiO) can also be used to catalyze the removal of SiO$_2$, the amount required being that which introduces about 0.2 to 0.6 percent of Fe. The Fe or Fe$_2$O$_3$ in a batch used to produce an insulator as described above is present in the insulator as FeSi$_2$, which forms during the nitridation process.

It will be appreciated that various changes and modifications can be made from the details of the instant invention as described above without departing from the spirit and scope thereof as defined in the appended claims and that, in its essential details, the invention is a method for producing a sintered reaction bonded silicon nitride insulator, which method comprises mixing powdered silicon having an average particle size not greater than 5μm with a suitable amount of a sintering aid pressing a shape from the resulting mixture, calcining the shape, grinding the calcined shape to a desired contour, and heating the ground shape in a nitrogen atmosphere at a pressure of about 1 atmosphere absolute. The sintering aid, most desirably, is 3 to 7 percent each of MgO and CeO$_2$, but can also be 2 to 8 percent of Y$_2$O$_3$, 6 percent of Y$_2$O$_3$ and 2 percent of Al$_2$O$_3$, or 2 to 8 percent of MgO, BeO, HfO$_2$ or ZrO$_2$. The heating of the ground shape is controlled, until a reaction bonded Si$_3$N$_4$ body is produced in which at least 99 percent of the Si in the initial charge is reacted to Si$_3$N$_4$, so that reaction between nitrogen and the ground shape is substantially complete at any given temperature before the shape is heated above that temperature, and, thereafter, to produce a sufficient amount of a cerium-magnesium silicate or other glass to produce a $Si_3N_4$ body having from 85 to 90 percent of theoretical density. Preferably, from about 1 to 10 volume percent of hydrogen is introduced into the furnace at the beginning of the firing cycle. Preferably, also, from about 20 to 30 volume percent of helium is introduced into the furnace at the beginning of the firing cycle.

I claim:

1. A method for producing a sintered reaction bonded silicon nitride insulator, which method comprises mixing powdered silicon having an average particle size not greater than 5µm with a suitable amount of a sintering aid pressing a shape from the resulting mixture, calcining the shape, grinding the calcined shape to a desired contour, heating the ground shape in a nitrogen atmosphere at a pressure of about 1 atmosphere absolute, and controlling the heating rate:

(a) until a reaction bonded $Si_3N_4$ body is produced in which at least 99 percent of the Si in the initial charge is reacted to $Si_3N_4$, so that reaction between nitrogen and the ground shape is substantially complete at any given temperature before the shape is heated above that temperature, and (b) thereafter, to produce, by reaction involving the sintering aid, a sufficient amount of a glass to produce a $Si_3N_4$ body having from 85 to 90 percent of theoretical density, wherein the suitable amount of a sintering aid is from 3 to 7 percent each of MgO and $CeO_2$, 2 to 8 percent of $Y_2O_3$, 6 percent and 2 percent of $Al_2O_3$, or 2 to 8 percent of MgO, BeO, $HfO_2$ or $ZrO_2$.

2. A method as claimed in claim 1 wherein the sintering aid is from 3 to 7 percent each of MgO and $CeO_2$, and the firing to complete the reaction between nitrogen and the ground shape is to a maximum temperature of about 1430°.

* * * * *

UNITED STATES PATENT AND TRADEMARK OFFICE
CERTIFICATE OF CORRECTION

PATENT NO. : 5,275,985
DATED : January 4, 1994
INVENTOR(S) : Jow-Lay Huang It is certified that error appears in the above-identified patent and that said Letters Patent is hereby corrected as shown below:

Line 12 of the Abstract should read:
 $Al_2O_3$, and 2 to 8 percent of MgO, BeO, $HfO_2$ or $ZrO_2$ Column 1, Line 18 should read:
 $\mu m$ mean $10^{-6}$ meter; 1 means liter or liters; psi means Column 3, Line 1 should read:
 (2) after about 1½ hours of the hold at 750°, introducing Column 4, Line 2 should read:
 ties of 2.45 $g/cm^3$, and to be composed of sintered reac- Column 5, Line 18 should read:
 contour, subjecting the ground shape to a single, uninterrupted heating step in contact with a nitrogen atmo- Column 6, Line 12 should read:
 and $CeO_2$, 2 to 8 percent of $Y_2O_3$, 6 percent $Y_2O_3$ and 2

Signed and Sealed this

Fifth Day of July, 1994

*Attest:*

BRUCE LEHMAN

*Attesting Officer*     *Commissioner of Patents and Trademarks*